US012414903B2

(12) United States Patent
LaRoche et al.

(10) Patent No.: US 12,414,903 B2
(45) Date of Patent: Sep. 16, 2025

(54) GASTROJEJUNAL TUBE APPARATUS AND METHODS OF USE

(71) Applicant: INMed, Inc., Plainfield, IN (US)

(72) Inventors: Thomas Patrick LaRoche, Danville, IN (US); Jeffrey Rajesh Ramkaransingh, Carmel, IN (US)

(73) Assignee: INMED, INC., Plainfield, IN (US)

( * ) Notice: Subject to any disclaimer, the term of this patent is extended or adjusted under 35 U.S.C. 154(b) by 199 days.

(21) Appl. No.: 17/767,747

(22) PCT Filed: Jan. 21, 2022

(86) PCT No.: PCT/US2022/013325

§ 371 (c)(1),
(2) Date: Jul. 28, 2022

(87) PCT Pub. No.: WO2022/159714

PCT Pub. Date: Jul. 28, 2022

(65) Prior Publication Data

US 2024/0082113 A1 Mar. 14, 2024

Related U.S. Application Data

(60) Provisional application No. 63/140,060, filed on Jan. 21, 2021.

(51) Int. Cl.
*A61J 15/00* (2006.01)

(52) U.S. Cl.
CPC ....... *A61J 15/0069* (2013.01); *A61J 15/0019* (2013.01); *A61J 15/0042* (2013.01); *A61J 15/0073* (2013.01); *A61J 15/0092* (2013.01)

(58) Field of Classification Search
CPC .... A61J 15/00; A61J 15/0015; A61J 15/0019; A61J 15/0042; A61J 15/0069; A61J 15/0073
See application file for complete search history.

(56) References Cited

U.S. PATENT DOCUMENTS 5,318,530 A 6/1994 Nelson, Jr.
9,095,502 B2 8/2015 Williams et al.
(Continued)

FOREIGN PATENT DOCUMENTS

CN 104984461 A 10/2015
CN 209378070 9/2019
(Continued)

OTHER PUBLICATIONS

PCT International Search Report (PCT/US2022/013325); Date of Issuance: Jun. 14, 2022.
(Continued)

*Primary Examiner* — Dung T Ulsh
(74) *Attorney, Agent, or Firm* — Brannon Sowers & Cracraft PC

(57) ABSTRACT

Gastrojejunal (GJ) tube apparatuses and methods for using the same where the GJ tube apparatuses having a plurality of tubes forming lumens within the apparatus and including a guidance tube having a closed end which is exposed by cutting off a portion of the GJ tube apparatus and which allows for insertion of a guide wire therethrough to assist in the placement of a new GJ tube such as when the existing tube becomes clogged or blocked.

18 Claims, 11 Drawing Sheets

(56) References Cited

U.S. PATENT DOCUMENTS

| | | | | |
|---|---|---|---|---|
| 9,283,151 | B2 | 3/2016 | Porreca, Jr. | |
| 9,301,903 | B2 | 4/2016 | Moss | |
| 9,539,181 | B2 | 1/2017 | Phillips et al. | |
| 2003/0225393 | A1 | 12/2003 | McMichael et al. | |
| 2011/0098660 | A1 | 4/2011 | Porreca, Jr. | |
| 2012/0203171 | A1 | 8/2012 | Williams et al. | |
| 2014/0142552 | A1 | 5/2014 | Honig | |
| 2014/0323966 | A1 | 10/2014 | Dziak et al. | |
| 2015/0272831 | A1 | 10/2015 | Moss | |
| 2016/0369130 | A1 | 12/2016 | Dziak et al. | |
| 2018/0055740 | A1* | 3/2018 | Singh | A61N 1/0509 |
| 2018/0207014 | A1* | 7/2018 | Rousseau | A61J 15/0015 |
| 2018/0344577 | A1* | 12/2018 | Coppola | A61J 15/0019 |
| 2019/0328621 | A1* | 10/2019 | Phillips | A61J 15/0073 |
| 2020/0086107 | A1* | 3/2020 | Ruffolo | A61J 15/003 |

FOREIGN PATENT DOCUMENTS

| | | | | |
|---|---|---|---|---|
| CN | 213822606 | | 7/2021 | |
| WO | WO-2019195093 | A1 * | 10/2019 | A61J 15/0019 |

OTHER PUBLICATIONS

PCT International Written Opinion (PCT/US2022/013325); Date of Issuance: Jun. 14, 2022.

* cited by examiner

GASTROJEJUNAL TUBE APPARATUS AND METHODS OF USE

CROSS-REFERENCE

This application claims the benefit of U.S. Provisional Patent Application No. 63/140,060 titled "GASTROJEJUNAL TUBE APPARATUS AND METHOD OF USE," filed Jan. 21, 2021, the entire disclosure of which is expressly incorporated by reference herein.

TECHNICAL FIELD

The present disclosure relates generally to gastrostomy feeding tube apparatuses and, more particularly, to gastrostomy feeding tube apparatuses that are configured for allowing simultaneous delivery of substances above and below the pyloric valve/pylorus in the gastrointestinal tract.

BACKGROUND

A gastrojejunal (GJ) feeding tube apparatus 20 is a tube inserted through an incision in the abdomen 24 and into the stomach 22 and the jejunum portion of the small intestine 38. GJ tubes are used in a variety of situations, typically in patients with impaired gastric motility, high risk of esophageal reflux with aspiration, pancreatitis, or some other condition which makes feeding only directly into the stomach undesirable or risky. The GJ tube apparatus 20 allows nutrition, hydration, other fluids, and medicines to be delivered directly to a location below the pyloric valve 36 past the duodenum 48 and into the jejunum 38.

A typical GJ tube apparatus 20, as depicted in FIG. 1, includes a first end 26 and a second end 40. The first end 26 includes a plurality of access ports 28, 30, 32 which allow access to internal tubes extending in a side-by-side orientation through the body of the apparatus 20. Each tube defines a lumen. The terms "tube" and "lumen" are used interchangeably herein, at times, in reference to a fluid passage (lumen) and the physical structure (tube) that forms a fluid passage. No limitation to structure is intended. Where references are made to a "tube", that element will be understood by definition to define at least one lumen. Any tube referenced herein can be an individual tubular element, one of several individual tubular elements attached together, or one of multiple integral internal walls of a single structure where each internal wall defines a fluid passage. Thus, a device having three tubes defines three lumens, and could be one single extruded elongate piece, or three attached elongate pieces, for example. One access port 28 and associated tube is connected to a balloon portion 34 which can be inflated at least temporarily once the GJ apparatus is positioned to prevent accidental withdrawal or movement of the apparatus. A second access port 30 and associated tube 44 allows access to an opening 52 which is positioned within the stomach to allow the introduction of nutrition, hydration, other fluids, and/or medicines through an opening 52 directly into the stomach. A third access port 32 and associated tube 42 allows access to an opening 50 which is positioned within the jejunum to allow the introduction of nutrition, hydration, other fluids, and/or medicines directly into the jejunum. The GJ apparatus 20 may also include a disk portion 46 or other outside positioning/retention element which rests against the skin and may prevent the apparatus from being inserted too far into the stoma 47, for example.

The procedure to place a GJ tube apparatus is typically performed by a clinician in a radiology suite so that ultrasound, X-ray, and/or other imaging techniques may be used to assist in correctly placing the apparatus. Care is usually taken to keep the GJ tube apparatus clean and clear, but it is not uncommon for at least one of the tubes to become clogged. A variety of different techniques have been developed for attempting to clear blockages once they occur such as that shown in U.S. patent application Ser. No. 13/679,160 to Honig. Such techniques have varying rates of success, but a certain percentage of tubes typically cannot be successfully or at least practically unclogged. Clogged tubes must be removed and a new one placed which typically uses the same time and resources as the initial placement procedure to correctly guide and place the new GJ tube apparatus. What is needed is a device and procedure which would reduce the time and effort required to place a subsequent GJ tube apparatus in a patient.

SUMMARY OF THE DISCLOSURE

In one aspect, a method of treating a patient includes establishing access, from a location outside the body of a patient, to a normally-closed retrieval lumen extending in parallel with a feed lumen in a gastrojejunal (GJ) tube apparatus, and advancing a guide wire through the retrieval lumen. The method further includes withdrawing the GJ tube apparatus from the body of the patient while leaving the guide wire in place. The method still further includes advancing a new GJ tube apparatus over the guide wire to a treatment location where a gastric feed opening and a jejunal feed opening of the new GJ tube apparatus are above and below the pylorus, respectively, in the patient's gastrointestinal tract, then removing the guide wire.

In another aspect, a gastrojejunal (GJ) tube apparatus includes an apparatus body with an outer wall, a first proximal end, and a second distal end. The outer wall also includes an inflatable balloon portion and optionally at least one cut indicia. A plurality of tubes travel substantially parallel to one another within the apparatus body and include a first tube having an opening in the proximal end of the apparatus body and an opening in the inflatable balloon portion, a second tube having an opening in the proximal end and an opening between the proximal end and the distal end to form a gastric feed opening, a third tube having an opening in the proximal end and an opening in the distal end to form a jejunal feed opening, and a guidance tube having a closed, blind end that is distal to the proximal end, and terminating at a location that is distal to the gastric feed opening. Cutting the apparatus body such as at the at least one cut indicia creates an opening in the guidance tube.

In still another aspect, a method of replacing the GJ tube apparatus as previously described is accomplished by withdrawing a portion of an existing GJ tube apparatus from a patient until a target area or location such as might be indicated by at least one cut indicia is outside the abdominal wall (if it is not already outside the abdominal wall), cutting the existing GJ tube apparatus so as to create an opening in the guidance tube, inserting a guide wire through the opening of the guidance tube, withdrawing the existing GJ tube apparatus while leaving the guide wire in place in the patient, placing a new GJ tube apparatus in the patient by threading the new GJ tube apparatus over the guide wire until the distal end of the new GJ apparatus is past the pyloric valve and in the small intestine, withdrawing the guide wire from the apparatus, and securing the new GJ tube apparatus to the patient.

In still another aspect, a gastrojejunal (GJ) tube apparatus includes an apparatus body having an outer wall, a first proximal end, and a second distal end, and an inflatable balloon portion. A first tube in the apparatus body forms an inflation fluid lumen extending between the proximal end of the apparatus body and the inflatable balloon portion. A second tube in the apparatus body forms a gastric feed lumen originating in the proximal end of the apparatus body, and terminating at a gastric feed opening formed between the proximal end and the distal end of the apparatus body. A third tube in the apparatus body forms a jejunal feed lumen originating in the proximal end of the apparatus body and terminating at a jejunal feed opening formed in the distal end of the apparatus body. A guidance tube in the apparatus body forms a retrieval lumen originating at a closed, blind end, and terminating at a location that is distal to the gastric feed opening.

In yet another aspect, a medical apparatus includes an apparatus body having an outer wall, a first proximal end, and a second distal end. A first tube in the apparatus body forms a lumen with a first opening at the apparatus body proximal end and a second opening at the apparatus body distal end. A second tube in the apparatus body forms a lumen with an open first end at the apparatus body proximal end and a closed second end disposed between the apparatus body proximal end and the apparatus body distal end. A third tube in the apparatus body forms a lumen with a closed first end disposed between the apparatus body proximal end and the apparatus body distal end and an open second end at the apparatus body distal end. The medical apparatus may further include at least one cut indicia on the apparatus body which may be positioned such that cutting the apparatus at the cut indicia creates a second open end in the third tube.

In a further aspect, GJ tube replacement kits containing a replacement GJ tube having one or more of the previously disclosed features as well as one or more other devices such as guide wires, securing clips, and the like required for removal and replacement of an existing GJ tube apparatus.

DETAILED DESCRIPTION

Figure 1:
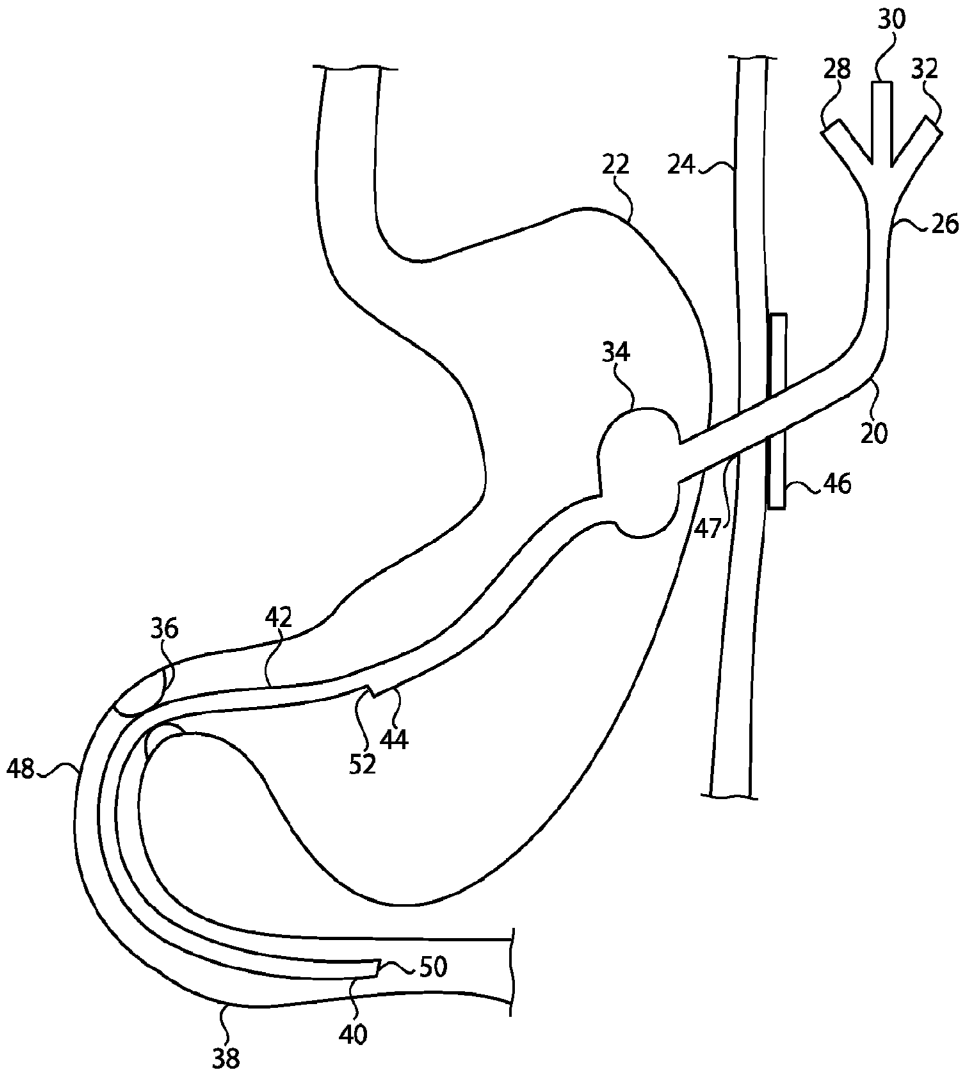
Prior Art FIG. 1
FIG. 1 is an illustrative view showing the placement of a gastrojejunal (GJ) tube apparatus.

Referring to the drawings, there are shown medical devices according to several embodiments. The present description will be understood to refer generally to all embodiments except where otherwise indicated or apparent from the context. Discussion herein of features or functionality of any one embodiment should be understood by way of analogy to refer to features or functionality of any other embodiment except where otherwise indicated or apparent from the context. References to a "first," a "second," a "third," and like descriptors are used merely for convenience and are not to be taken to require any particular identity, ordering, or arrangement of elements described.

Figure 3:
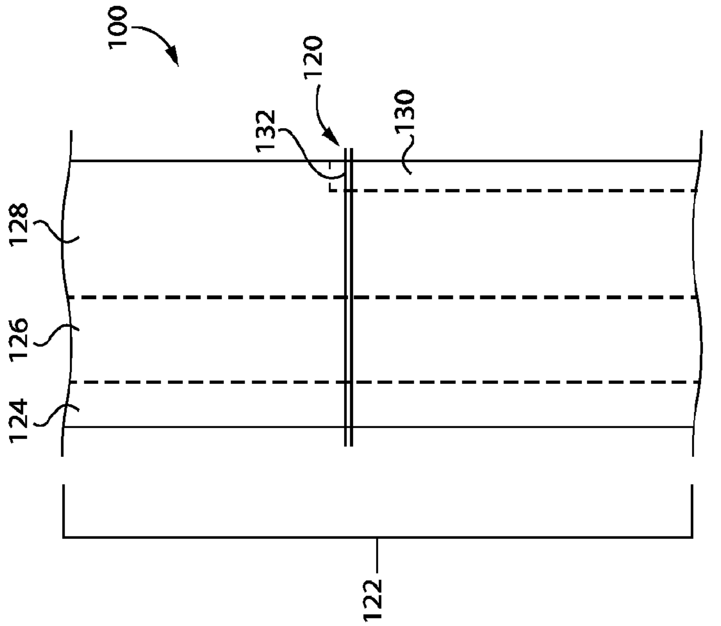
FIG. 3 is a plan view of a portion of the apparatus shown in FIG. 2.
Figure 2:
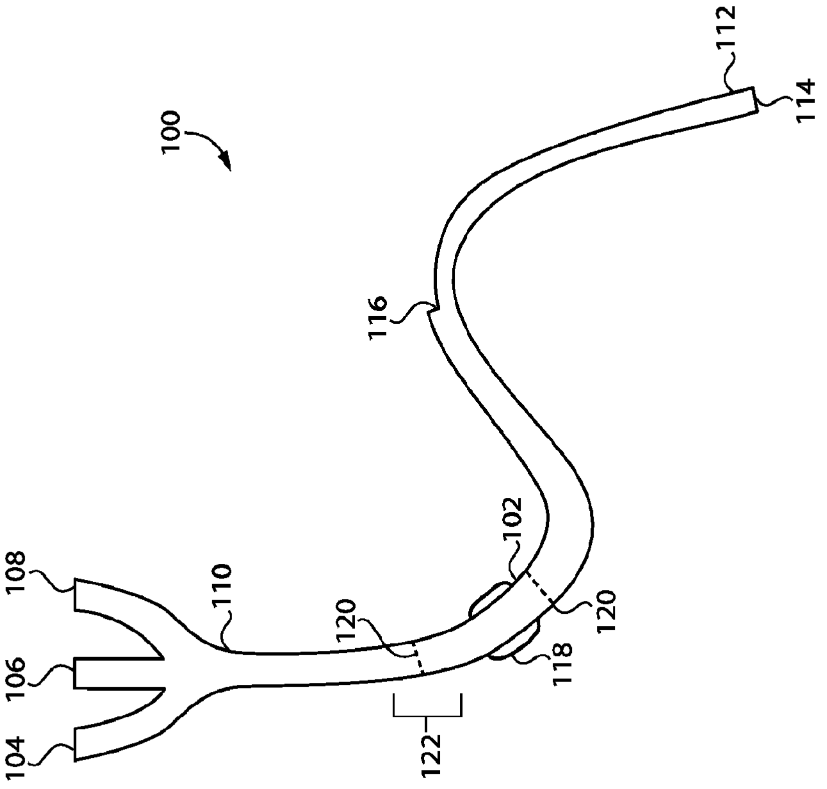
FIG. 2 is a plan view of a GJ tube apparatus according to one embodiment.

FIGS. 2-3 show a gastrojejunal (GJ) tube apparatus 100 according to one embodiment of the present disclosure. In this example the tube apparatus 100 includes a first, proximal end portion 110 or "hub" and a second, distal end portion 112. The first end portion 110 includes a first access port 104 associated with a first tube 124 forming an inflation fluid lumen, a second access port 106 associated with a second tube 126 forming a first feed lumen, and a third access port 108 associated with a third tube 128 forming a second feed lumen. The access ports 104, 106, 108 may include a closure device or cover such as removable caps. The tubes 124, 126, 128 run substantially parallel to one another through the elongate apparatus body 102. First access port 104 and tube 124 are operationally connected to a balloon portion 118 and allow for the introduction and removal of an inflation fluid, such as saline solution, contrast, water, or air, into balloon portion 118 as desired. Second access port 106 and tube 126 are operationally connected to opening 116 which allows access to the stomach once the apparatus 100 is placed in a patient. Third access port 108 and tube 128 are operationally connected to opening 114 which allows access to the jejunum once the apparatus 100 is placed in a patient. The apparatus 100 may further include at least one indicia 120 (a cut indicator). The indicia 120 may be one or more marks molded into the material of the apparatus 100 such as a line or ridge or series of lines/ridges, or one or more bumps to name a few examples. The indicia 120 may also include a color or other indelible marking or otherwise visible feature, a surface texture feature, or still other indicia to provide visual and/or tactile features. In the illustrated embodiment indicia are shown both proximal to and distal to balloon portion 118. In some instances only the indicia distal to balloon portion 118 is used, or only the indicia proximal to balloon portion 118.

The indicia 120 are located in a transition area 122 of the apparatus body 102 where a fourth tube 130 forming a normally-closed retrieval lumen originates and runs substantially parallel to tubes 124, 126, 128 through the apparatus body 102. Indicia 120 marks where a new access opening to tube 130 may be established by cutting apparatus body 102 and removing or partially removing first end 110 from the apparatus 100 thereby creating a fourth access port or point 132 which allows access to fourth tube 130 and the associated retrieval lumen. Fourth tube 130 typically terminates at a fourth opening which allows access to the small intestine, distal to the gastric feed opening, and at some point past the pyloric valve/pylorus when the apparatus 100 in placed in a patient. The opening of the fourth tube 130 forming the retrieval lumen can include a normally closed opening, formed with a valve, a membrane that can be punched through with a guidewire, or some other plug or closure that can be removed, enlarged, or opened when the retrieval lumen is to be used as discussed herein. In one embodiment the distal opening of the retrieval lumen (the fourth opening of fourth tube 130) is positioned in a terminal distal tip of apparatus 100. In other instances, it might be located proximal to the terminal tip, proximal to the jejunal feed opening, and formed in the nature of a side port. In still other instances the terminal normally closed opening could be located in the distal terminal tip of apparatus 100, as discussed in connection with FIG. 13 below, and in some cases could even be positioned distal to a jejunal feed opening.

Embodiments are also contemplated where a guidance tube forming a retrieval lumen is a distal portion of tube 126 forming the gastric feed lumen. Those skilled in the art will appreciate that a GJ tube can be formed with a lumen that extends an entirety of a longitudinal length of the apparatus, but is plugged or closed in a distal portion, to supply nutrition, fluids, etc., to a gastric feed opening proximal to the unavailable distal portion. According to the present disclosure, a retrieval lumen could be an extension or a continuation of a gastric feeding lumen that is accessed or opened to accept a guide wire for swapping out the apparatus. Those skilled in the art will also be familiar with conventional functions of a gastric feeding tube, and the conventional structure of filling or occluding a distal portion of a gastric feeding tube. According to the present disclosure, the normally filled or occluded portion might be removed by withdrawing and cutting a GJ tube apparatus at a cut indicia as described herein, but could also be accessed by punching through a filled, occluded, or valved portion with a guide wire to establish a retrieval lumen extending all the way to, or to a location near, a terminal tip of the GJ tube apparatus. In such an application, a user could employ a relatively stir tipped guidewire to open the retrieval lumen, and then substitute that guide wire for a guide wire having a softer tip, although in other instances the same guide wire might be used. As also further discussed herein, the retrieval lumen and associated tube may serve to stiffen the GJ tube apparatus. Embodiments are contemplated where the normally closed or occluded portion of the gastric feeding lumen distal to a gastric feed opening has a desired stiffness to inhibit kinking as discussed herein. An entirety of a gastric feeding lumen, including a proximal portion used for gastric feeding, and a normally closed distal portion used as a retrieval lumen, might have a greater stiffness than other parts of the GJ tube apparatus as also discussed herein.

When apparatus 100 becomes clogged, based on material stuck in one or both of the gastric feed lumen and jejunal feed lumen, and requires replacement a guide wire may be inserted down the length of tube 130, the clogged GJ tube apparatus withdrawn, and a new GJ apparatus placed by following the length of the guidewire holding the proper placement path. The guide wire may then be withdrawn and the new GJ tube apparatus secured as desired. The fourth tube 130 provides clear access past the pyloric valve/pylorus and any blockage in the jejunal feeding lumen to assist in placement of a new GJ tube apparatus threaded over the guide wire when necessary. Enclosing the opening 132 to the tube 130 (a closed, blind end of tube 130) ensures the tube is not inadvertently used, patent, and remains sterile and does not provide a path for infection in the patient or present other problems. In a traditional GJ tube only one of the tubes (the tube accessing the jejunum) typically provides access to a point past the pyloric valve/pylorus and that tube is often the most likely tube to be clogged and thus unavailable for insertion of a guide wire past a blockage of the tube as it is given the use in providing nutrition, etc., into the jejunum.

Figure 4:
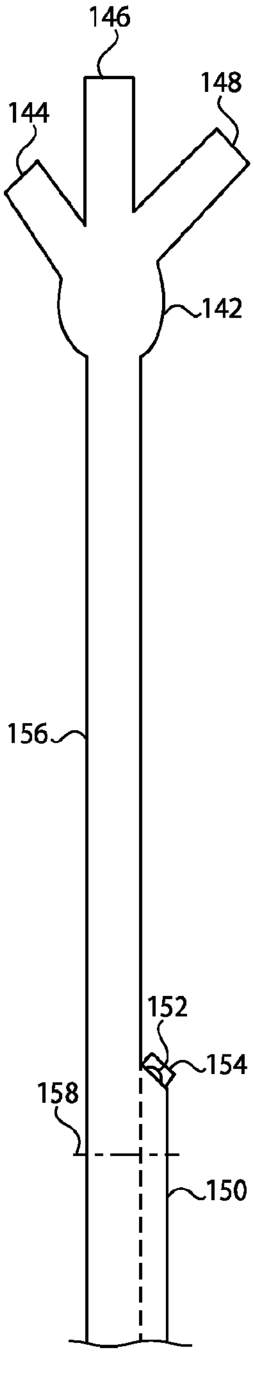
FIG. 4 is a plan view of a GJ tube apparatus according to one embodiment.

FIG. 4 shows a gastrojejunal (GJ) tube apparatus 140 according to another embodiment. In this example, a GJ tube apparatus includes a first end 142 and a second end (not shown). The first end 142 has a first access port 144 associated with a first tube, a second access port 146 associated with a second tube, and a third access port 148 associated with a third tube. GJ tube apparatus 140 further includes a fourth access port 152 associated with a fourth tube 150 forming a retrieval lumen and located along GJ tube body 156 between the first end 142 and the second end. Fourth access port 152 includes a sealing portion 154 to prevent material from infiltrating tube 150. Sealing portion 154 may be a removable/replaceable device such as a cap, lid, or plug, or it may be a sealed closure which must be cut to allow access to opening 152 and tube 150. Optionally, one or more indicia 158 may be included on tube body 156 to indicate where the GJ tube apparatus 140 may be cut to allow access to tube 150.

Figure 5:
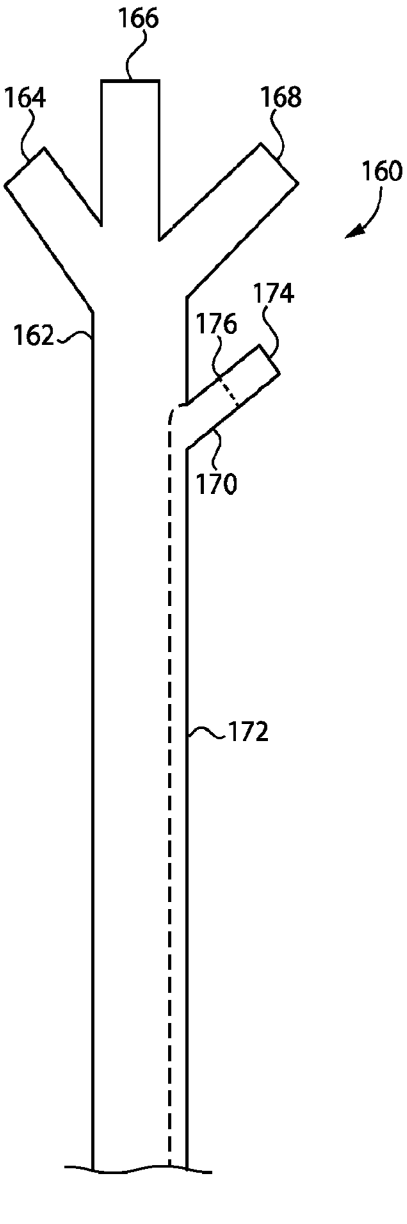
FIG. 5 is a plan view of a GJ tube apparatus according to one embodiment.

FIG. 5 shows a gastrojejunal (GJ) tube apparatus 160 according to another embodiment. In this example, a GJ tube apparatus 160 includes a first end 162 and a second end (not shown). The first end 162 has a first access port 164 associated with a first tube, a second access port 166 associated with a second tube, and a third access port 168 associated with a third tube. GJ tube apparatus 160 further includes a fourth access port 170 associated with a fourth tube 172 located at the first end 162, and forming a retrieval lumen. Fourth access port 170 may include a sealing portion 174 to prevent material from infiltrating tube 172. Sealing portion 174 may be a removable/replaceable device such as a cap, lid, or plug, or it may be a sealed closure which must be cut to allow access to access port 170 and tube 172. Optionally, one or more indicia 176 may be included on the tube body to indicate where the GJ tube apparatus 160 may be cut to allow access to tube 172.

Figure 13:
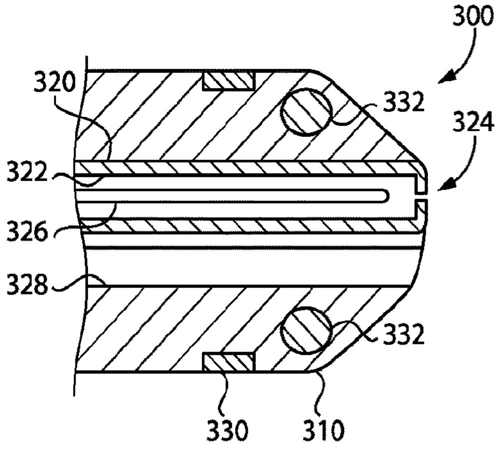
FIG. 13 is a sectioned view of a tip of a GJ tube apparatus, according to one embodiment.

Referring now to FIG. 13, there is shown a GJ tube apparatus 300 having a distal tip 310. Apparatus 300 could be, or could be combined with, any of the embodiments contemplated herein, and includes a retrieval lumen 322 formed by a guidance tube 320. A jejunal feeding lumen 328 extends through apparatus 300. A radiopaque marker 330 is attached to tip 310 in the illustrated embodiment. A guide wire is shown at 326 as it might appear just proximal to a diaphragm 324, or another suitable closure such as a valve, at a distal opening of retrieval lumen 322. As discussed herein a variety of different closure techniques can be used for a distal opening of a retrieval lumen such that the retrieval lumen is normally closed until such time as it is opened for use. It will be appreciated that retrieval lumen 322 may be normally closed at both a proximal end and a distal end thereof. Guidance tube 320 may be formed of a stiffening material as described herein, associated with or attached to stiffening elements such as an embedded coil, or otherwise structured to impart a desired enhanced stiffness to the portions of apparatus 300 through which guidance tube 322 extends. Guidance tube 320 could be full-length through apparatus 300, normally closed and openable by cutting or removing a closure at a proximal end but could also be only partial length in apparatus 300 as discussed in connection with some of the embodiments herein. Apparatus 300 also includes one or more weights 322 embedded in material of tip 310, with weights 332 assisting in advancing tip 310 and apparatus 300 through a patient's anatomy, such as past the pylorus. Weight 322 might be metallic, for example.

FIGS. 6-9 show cross-sectional views of gastrojejunal (GJ) tube apparatus bodies according to several embodiments. These examples are provided for illustrative purposes only and the exact size, shape, and configuration of tubes in different embodiments may vary. Typically, tubes used to provide access to the stomach and jejunum will be larger than those providing access to the balloon portion and the guidewire placement pathway or retrieval lumen. The exact size, shape, and configuration of the individual tubes may vary according to a particular GJ tube apparatus requirements and design. The GJ tube walls may be made from a variety of materials such as elastomeric polyurethanes, polyacrylates, polyolefins, polyamides including nylons, polyesters, fluoropolymers, silicones, polyphosphazenes, perfluoroelastomers, fluoroelastomers, and copolymers, derivatives, blends and alloys of such polymers may be used. Additionally, reinforcing materials such as metals and/or composite materials may be included in all or portions of the GJ tube walls as desired. The fourth tube forming a retrieval lumen may include, for example, a polyimide.

In some embodiments other parts or an entirety of the GJ apparatus except for the fourth tube forming the retrieval lumen may be formed of a first material, and the fourth tube may be formed of a second material different from the first material. The several tubes of GJ tube apparatuses according to the present disclosure may be coextruded. In some embodiments, the fourth tube can be inserted into a lumen formed in the GJ tube apparatus body and embedded therein, such as by an adhesive, by melting, held by friction, or attached by any other suitable strategy. In still other embodiments the fourth (rescue) lumen may be formed with both ends open and then one end, which is to be the proximal end, is then closed/sealed prior to placing the lumen within a GJ tube apparatus.

Figure 6:
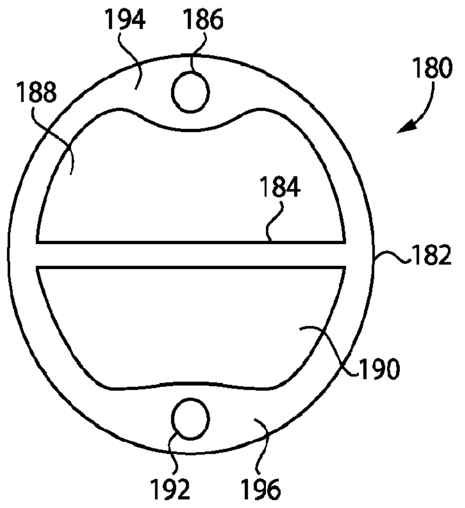
FIG. 6 is a cross sectional view of a GJ tube apparatus body according to one embodiment.

In the first example shown in FIG. 6, a GJ tube apparatus 180 includes an outer wall 182 which encloses and defines the outer boundary of a plurality of tubes. The tubes include a first tube 188, a second tube 190, a third tube 186, and a fourth tube 192. The first tube 188 and second tube 192 are separated by a dividing wall 184. The third tube 186 and fourth tube 192 in this example are separated from the first tube 188 and the second tube 190, respectively, by thickened portions 194, 196 of the outer wall 182.

Figure 7:
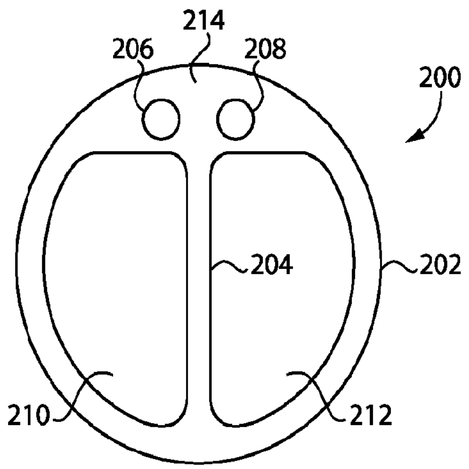
FIG. 7 is a cross sectional view of a GJ tube apparatus body according to one embodiment.

In the example shown in FIG. 7, a GJ tube apparatus 200 includes an outer wall 202 which encloses and defines the outer boundary of a plurality of tubes. The tubes include a first tube 210, a second tube 212, a third tube 206, and a fourth tube 208. The first tube 210 and second tube 212 are separated by a dividing wall 204. The third tube 206 and fourth tube 208 in this example are separated from the first tube 210 and the second tube 212, by a thickened portion 214 of the outer wall 202.

Figure 8:
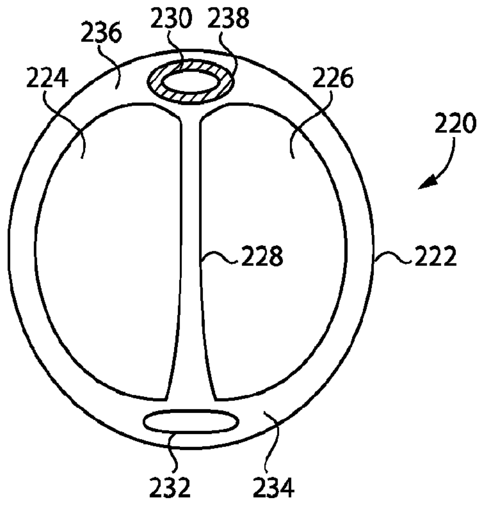
FIG. 8 is a cross sectional view of a GJ tube apparatus body according to one embodiment.

In the third example shown in FIG. 8, a GJ tube apparatus 220 includes an outer wall 222 which encloses and defines the outer boundary of a plurality of tubes. The tubes include a first tube 224, a second tube 226, a third tube 230, and a fourth tube 232. The first tube 224 and second tube 226 are separated by a dividing wall 228. The third tube 230 and fourth tube 232 in this example are separated from the first tube 224 and the second tube 226, by thickened portions 234, 236 of the outer wall 222. In this particular example, the third tube 230 and fourth tube 232 are shown as having an oval cross section. Additionally, the third tube 230 is defined by a wall 238 which includes one or more reinforcing materials such as those previously discussed. The wall 238 of third tube 230 in this example is stiffer than the wall 222 of the tube 220 generally which serves to resist kinking of the apparatus during and after placement, particularly when advancing past the pyloric valve/pylorus during placement, as well as preventing pinching and possible collapse of one or more of the other tubes of the apparatus. The material, such as a polyimide, of which wall 238 is made may have an anti-kinking stiffness compared to stiffnesses of the walls of the other tubes. In this example, wall 238 and third tube 230 form the retrieval lumen, having a closed, blind end, outside the plane of the page in FIG. 8. Tube 230 is cut to form a new opening to tube 230 to feed a guide wire through apparatus 220 as described herein.

Figure 9:
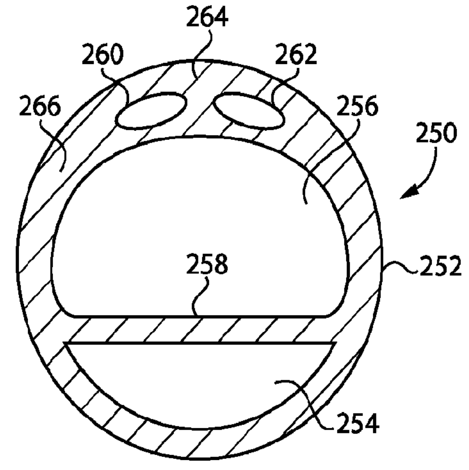
FIG. 9 is a cross sectional view of a GJ tube apparatus body according to one embodiment.

In the fourth example shown in FIG. 9, a GJ tube apparatus 250 includes an outer wall 252 which encloses and defines the outer boundary of a plurality of tubes. The tubes include a first tube 256, a second tube 254, a third tube 260, and a fourth tube 262. The first tube 256 and second tube 254 are separated by a dividing wall 258. In this particular example the first tube 256 is larger than the second tube 254. The third tube 260 and fourth tube 262 in this example are separated from the first tube 256 by a thickened portion 264 of the outer wall 252. In this particular example, the third tube 260 and fourth tube 262 are shown as having an oval cross section. Additionally, portions of the outer wall 252 include one or more reinforcing materials 266 such as those previously discussed. The portions of the wall 252 in this example may include integral stiffeners which serve to prevent kinking of the apparatus during and after placement as well as preventing pinching and possible collapse of one or more of the tubes of the apparatus. In other examples, all or only select portions of the outer wall may include reinforcing materials so as to inhibit kinking along the entire length of the GJ tube apparatus or only at select portions of the apparatus.

Various applications of the anti-kink stiffening properties of an integral stiffener component can be observed in situ. Enhanced stiffening can assist in maintaining tube shape and preventing kinking after the GJ tube apparatus is placed in its correct location in a patient, secured, and the guide wire removed. During the normal physiological processes of gastrointestinal peristalsis motion of a patient's gastrointestinal tract can sometimes cause or contribute to the potential for clogging and malfunction. Adding rigidity in select locations in a GJ tube according to the present disclosure, including in the distal portion within the jejunum, can assist in maintaining a desired location, potentially extending the usable life of the apparatus. Another cause of premature GJ tube failure can be GJ tube retro-migration with retraction and sometimes coiling of the portion of the GJ tube intended for positioning in the jejunum into the patient's stomach. Variations in patient anatomy, for instance, can be associated with different orientations of the GJ tube, and variations in GJ tube entry angle at the time of insertion can occur based upon preferences of the physician performing the procedure, unavoidable procedure-to-procedure variations, stomach access relative to the locations of the pylorus and overall stomach shape, to name a few examples. Physiological forces such as peristalsis and duodenogastric reflux (associated with GI motility issues, retching, and vomiting) can contribute to this phenomenon. The added rigidity as described herein, including relatively more rigid material types or inserted or molded-in metal coil components in critical areas associated with key anatomic locations, can assist in combatting the anatomic variations, placement variability, and physiological processes that can cause undesired migration during the course of the intended use life of the GJ tube apparatus.

Figure 14:
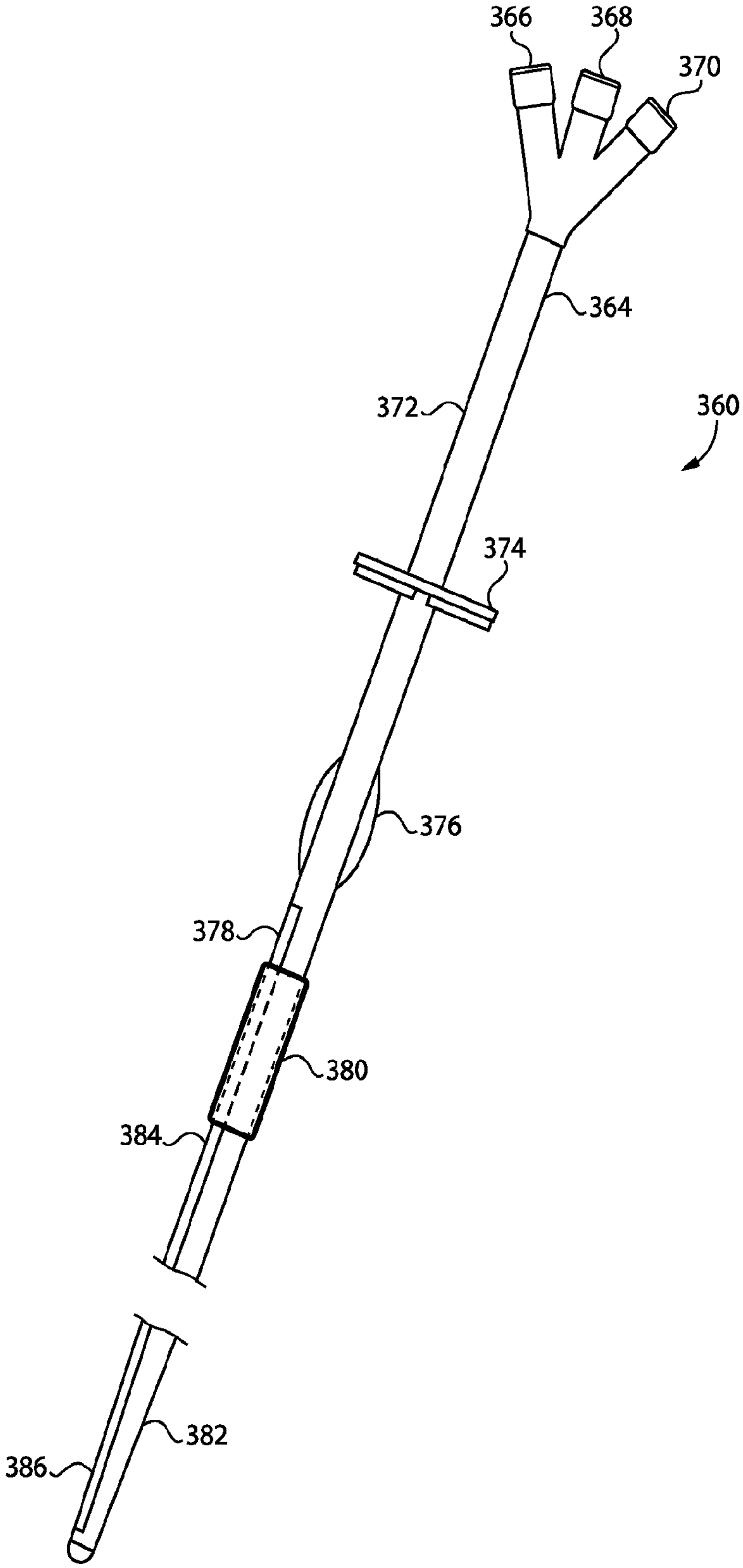
FIG. 14 is a plan view of a GJ tube apparatus according to one embodiment.

In another example shown in FIG. 14, a GJ tube apparatus 360 includes a first, proximal end portion 364 and a second, distal end portion 382. The proximal end portion 364 includes a plurality of access ports 366, 368, 370, each of which is associated with a separate lumen (not shown) which allows for the introduction of nutrition, medicaments, fluids for hydration or for balloon inflation, and the like. In other examples more or fewer access ports are provided. The access ports 366, 368, 370 may include a closure device or cover such as removable caps. The lumens run substantially parallel to one another through the elongate apparatus body 372. One of the access ports and associated lumen are operationally connected to a balloon portion 376 and allow for the introduction and removal of an inflation fluid, such as saline solution, contrast, water, or air, into balloon portion 376 as desired. A disk portion 374 is disposed on the apparatus body 372 between the proximal end 364 and the balloon portion 376 such that when the apparatus is placed in a patient and the balloon inflated the device is secured in place with the abdominal wall between the balloon and the disk portion 374. In this particular example, one of the remaining access ports is associated with a lumen which allows access to the stomach, and another access port and associated lumen are operationally connected to an opening which allows access to the jejunum once the apparatus 360 is placed in a patient.

The GJ tube apparatus 360 further includes a securing portion 380 disposed about the apparatus body 372 at a point between the distal 382 and proximal 364 ends. The securing portion 380 may be made of the same or different material as the apparatus body 372. The securing portion 380 may be formed as part of the manufacturing process of the apparatus body 372 or may be separately formed and then later mounted and secured to the apparatus body 372 (such as by using bonding agents, sonic welding, or other suitable fusion methods). Optionally, the securing portion 380 may be colored so as to make it easier to distinguish from the apparatus body 372 generally. The securing portion 380 may be textured so as to make it easier to grip and/or identify by touch and it may include indicia indicating a cut line or zone, or cut indica could be placed near securing portion 380, such as just proximal thereto to guide a clinician to the appropriate location for creating the new access to retrieval lumen as further discussed herein.

A fourth lumen comprising a retrieval or rescue lumen 384 originates at a point between the proximal end 364 and distal end 382 of the GJ tube apparatus 360 and runs substantially parallel to the other lumen before terminating at a distal end 386 which is at or near the distal end 382 of the GJ tube apparatus 360. In this particular example, the rescue lumen 384 originates at a proximal end 378 having a sealed or blind end portion 362 disposed between the securing portion 380 and the proximal end 364 of the GJ tube apparatus 360. In other examples, the rescue lumen may originate at a sealed end portion disposed at some point encircled by the securing portion. The exact positioning of the proximal end of a rescue lumen according to the disclosed invention and its length relative to the overall length of the GJ tube apparatus body may vary according to a particular application. In one example, the rescue lumen is at least 50%-66% of the overall length of the GJ tube apparatus body. In another example, in so called "low profile" GJ tube apparatuses such as those used in natal settings the rescue lumen may comprise up to 80% of the overall length of the GJ tube apparatus body.

The rescue lumen typically terminates at an opening which allows access to the small intestine, distal to the gastric feed opening, and at some point past the pyloric valve/pylorus when the apparatus 360 in placed in a patient. The opening of the rescue lumen can include a normally closed opening, formed with a valve, a membrane that can be punched through with a guide wire, or some other plug or closure that can be removed, enlarged, or opened when the retrieval lumen is to be used as discussed herein. In one embodiment the distal opening of the retrieval lumen is positioned in a terminal distal tip of the GJ tube apparatus. In other instances, it might be located proximal to the terminal tip, proximal to the jejunal feed opening, and formed in the nature of a side port. In still other instances the terminal normally closed opening could be located in the distal terminal tip of the GJ tube apparatus, as previously discussed in connection with FIG. 13, and in some cases could even be positioned distal to a jejunal feed opening.

Figure 15:
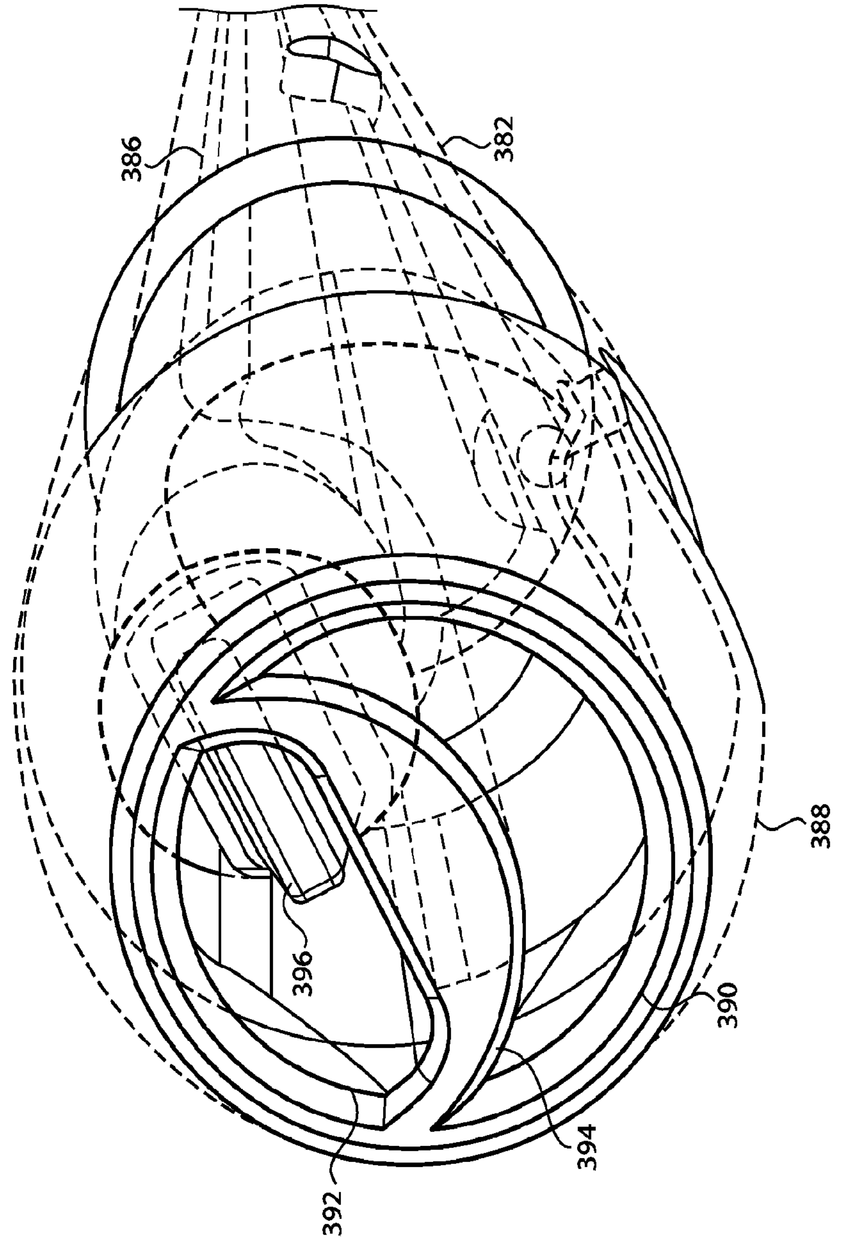
FIG. 15 is a perspective view of the distal end of the GJ tube apparatus of FIG. 14.

One example of the distal end of a rescue lumen is shown in greater detail in FIG. 15. In this particular example, the distal end 382 of the GJ tube apparatus 360 includes a lumen tip portion 388 having a first opening 390 and a second opening 392 separated by a partition 394. The partition 394 is positioned and configured so as to prevent materials passing down the lumen of the apparatus body 372 from collecting and building up within the lumen tip portion 388. Such build-up might otherwise create an obstruction which would prevent the GJ tube apparatus 360 and/or the valve assembly 396 of the rescue lumen 384 from functioning properly. Optionally, the lumen tip portion 388 is made from a radiopaque material for increased visibility during placement of the GJ tube apparatus 360. The distal end 386 of the rescue lumen 384 is disposed within the lumen tip portion and is fitted with a recessed valve assembly 396. The valve assembly 396 acts as a check valve such that it prevents material passing down the other lumen of the GJ tube apparatus 360 (food, medicaments, and the like) from entering and potentially clogging the rescue lumen 384, but a guide wire traveling down the rescue lumen 384 from the proximal end 378 toward the distal end 386 will open the valve assembly 396 allowing for proper placement of the wire during the replacement procedure for the GJ tube assembly.

Figure 16:
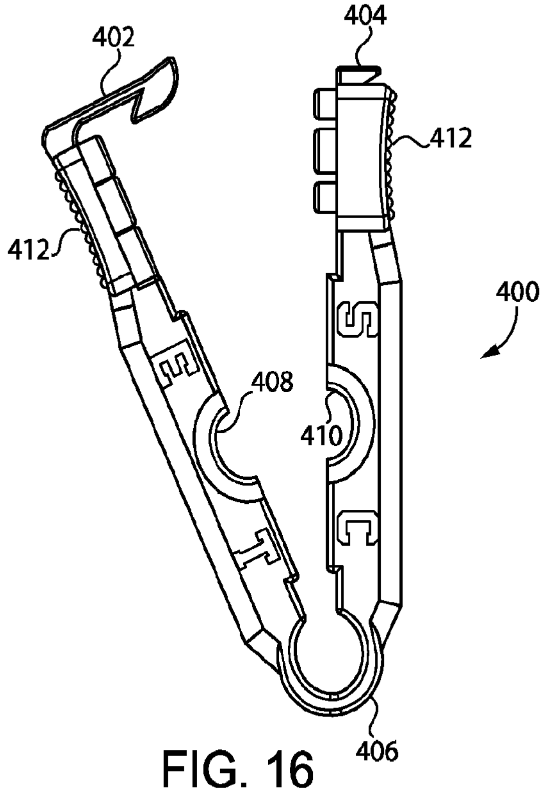
FIG. 16 is a side view of a securing clamp according to one embodiment.
Figure 17:
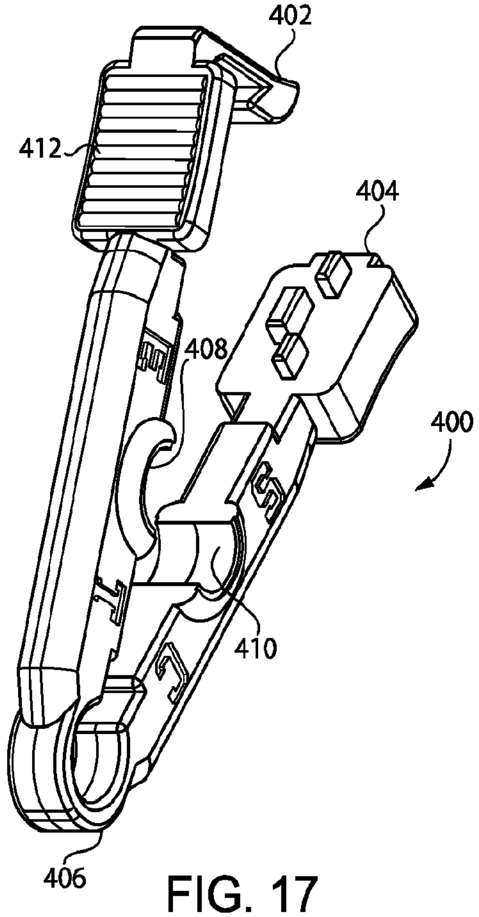
FIG. 17 is a perspective view of the securing clamp of FIG. 16.

FIGS. 16-17 show an example of a securing clip 400 for use with a GJ tube assembly such as that shown in FIG. 14. In this particular example, the securing clip 400 includes a first portion 414 or jaw having a first securing feature 402 and a clamping portion 408 and a second portion 414 or jaw having a second securing feature 404 and a clamping portion 410. The first portion 416 and second portion 414 are operationally connected by a flexible hinge 406. A block 411 may be within hinge 406 to inhibit inadvertent placement of a tube in the vicinity of hinge 406. The first portion 416 and second portion 414 may further include associated gripping portions 412 to allow for easier grasping and use. The hinge 406 is configured so that when the first portion 416 and second portion 414 are urged towards one another the first securing feature 402 and the second securing feature 404 interact and hook, snap, lock, or otherwise secure the clip 400 in a closed position. The first securing feature 402 and the second securing feature 404 are optionally configured such that once secured in the closed/latched position they may not be unlatched. The first clamping portion 408 and second clamping portion 410 are sized and configured such that when the securing clip 400 is in the closed/secured position the clamping portions 408, 410 form an opening which is slightly smaller in diameter, although potentially equal in diameter, than the apparatus body 372 of a GJ tube apparatus 360 such as shown in FIG. 14. That is, when an apparatus body 372 is disposed within the clamping portions 408, 410 of a closed/secured clip 400 the clamping portions 408, 410 exert sufficient pressure on the apparatus body 372 to prevent the clip 400 from moving relative to the apparatus body 372 but insufficient pressure so as to collapse or close the lumen within the apparatus body 372. In other examples, the first clamping portion 408 and second clamping portion 410 are sized and configured such that when the securing clip 400 is in the closed/secured position the clamping portions 408, 410 form an opening which is slightly smaller in diameter than the securing portion 380 of a GJ tube apparatus 360 such as shown in FIG. 14. That is, when an apparatus body 372 is disposed within the clamping portions 408, 410 of a closed/secured clip 400 the clamping portions 408, 410 form a passage with a diameter smaller than the diameter of the securing portion 380 such that the securing clip may not slide over or past the securing portion 380 thereby preventing the GJ tube from moving back into the opening in the abdominal wall.

Optionally, the clamping portions 408, 410 may include surface textures or material (adhesives, abrasives, and the like) so as to increase grip between the clamping portions 408, 410 and a securing portion 380. Use of a securing clip 400 such as described in this example in a replacement procedure for a GJ tube apparatus 360 such as shown in FIG. 14 is described in greater detail below with respect to FIGS. 18-19. It is contemplated that GJ tube assemblies such as those described herein may be packaged in suitable sterile packaging along with the associated securing clip(s), guide wire(s) and other articles used during a replacement procedure. Such packaging ensures all the necessary or desirable materials are present and such materials are correctly sized and configured for use together.

Figure 20:
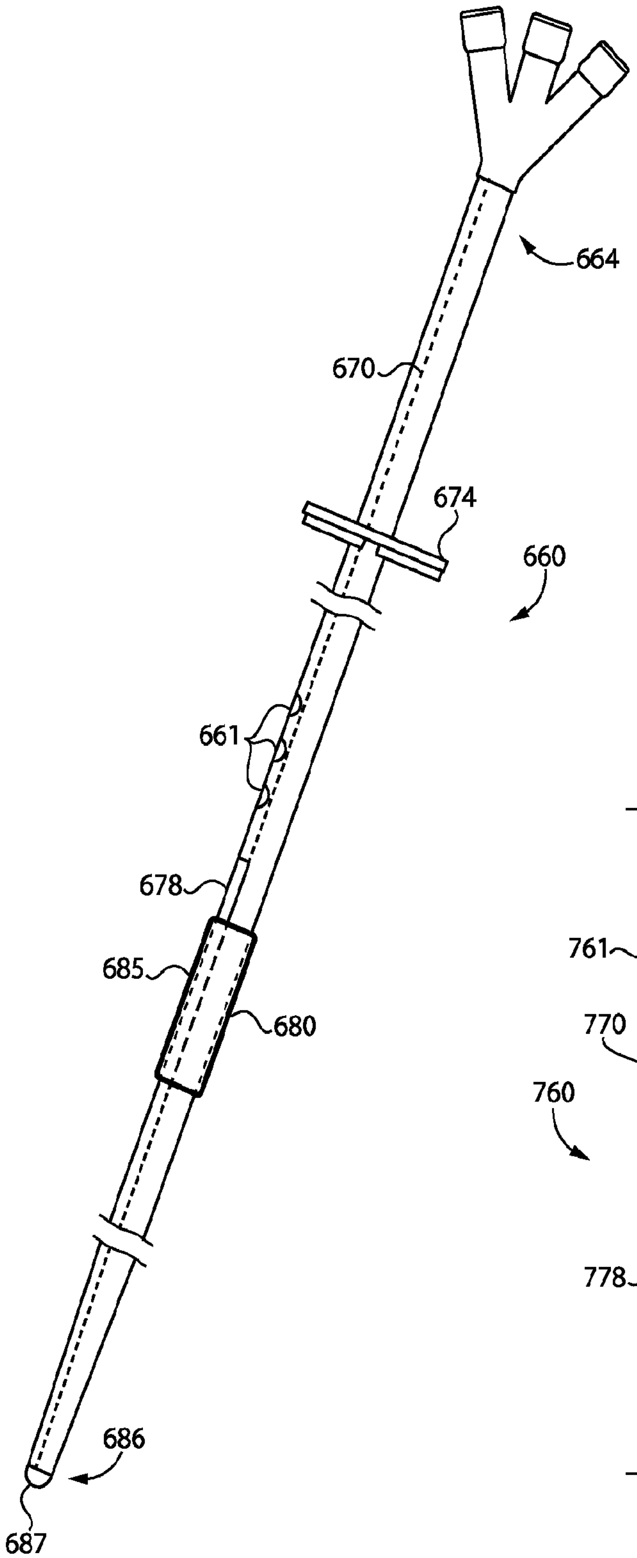
FIG. 20 is a plan view of a GJ tube apparatus according to one embodiment.

Referring now to FIG. 20, there is shown a GJ tube apparatus 660 having similarities with other embodiments discussed herein, but certain differences. GJ tube apparatus 660 is configured as a multi-lumen catheter including a hub at a proximal end 664, and a distal end 686 including a distal tip 687. Although not specifically shown, a jejunal feeding lumen extends all the way through GJ tube apparatus 660. A balloon inflation lumen extends to a balloon (neither shown). It will be appreciated that such a balloon may be positioned at a location distal to a disk 674 generally equivalent to analogous structures discussed elsewhere herein. A gastric feeding lumen 670 extends to a plurality of gastric feed openings 661, of any suitable number, configured as side ports in GJ tube apparatus 660. Plug or backfill material 678 is within gastric feeding lumen 670 distal to feed openings 661. Further distal, however, no backfill is used thus creating an open and usable guidance tube or retrieval lumen 685.

It can thus be appreciated that during construction a lumen can be formed, such as by extrusion, that extends through the full length of GJ tube apparatus 660, but is selectively plugged distal to the locations of gastric feeding. A one-way valve, membrane, or the like as discussed herein can be within the distal-most part of retrieval lumen 685. As also discussed herein, the one-way valve or other obstruction can be recessed within distal tip 687, as in FIG. 15.

An enlarged securing portion 680, such as a sleeve or simply an enlarged part of GJ tube apparatus 680, is positioned distal to gastric feed openings 661, and distal to at least some of backfill material 678. Given this construction, a user can cut through securing portion 680 to create a new opening to the formerly blind proximal end of retrieval lumen 685. Use of GJ tube apparatus 660 is similar to other embodiments discussed herein in that a user can partially withdraw GJ tube apparatus from a patient to reveal securing portion 680—if used—and then cut through GJ tube apparatus 660, apply a clip, and then swap GJ tube apparatus 660 for a replacement.

Figure 21:
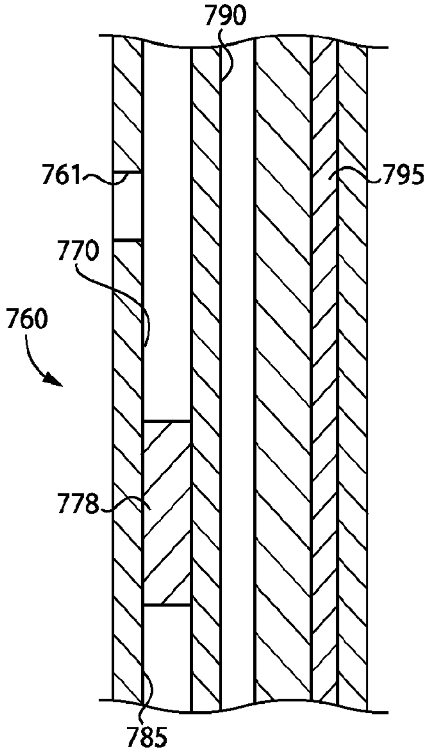
FIG. 21 is a sectioned view of a GJ tube apparatus according to one embodiment.

Referring now to FIG. 21, there is show a GJ tube apparatus 760 according to yet another embodiment. GJ tube apparatus 760 has similarities to other embodiments discussed herein, but also certain differences. GJ tube apparatus 760 can be implemented similarly to GJ tube apparatus 660 of FIG. 20, and includes backfill 778 within a single tubular passage that forms a gastric feeding lumen 770 including one or more gastric feed openings 761 and a retrieval lumen 785 having a blind end formed by backfill 778. An anti-cut structure 795 is embedded within GJ tube 760 and serves to inhibit severing of GJ tube apparatus when cut to form an opening to retrieval lumen 785, analogous to other embodiments discussed herein. In an implementation, anti-cut structure 795 includes a metallic wire or coil. In other instances, anti-cut structure 795 includes a relatively harder non-metallic material within a relatively softer non-metallic material forming GJ tube apparatus 760 proper. Thus, a user can cut through the relatively softer non-metallic material but the cut will tend to be stopped by contact with anti-cut structure 795. Since GJ tube apparatus 760 is not severed into two pieces risk of a distal portion slipping back into a patient is reduced or eliminated, and thus use of a clip or like structure or other techniques may be unnecessary.

While certain of the foregoing embodiments employ a single, continuous passage that is backfilled in part to divide a gastric feeding lumen from a retrieval lumen, it should be appreciated the present disclosure is not limited in this regard. A dedicated gastric feeding lumen might extend only so far as is needed to reach gastric feed openings and run in parallel or sequentially to a retrieval lumen that is blocked at a proximal end thereof, for example. Those skilled in the art will envision still other alternative strategies that enable a user to access a normally closed retrieval lumen

INDUSTRIAL APPLICABILITY

Figure 11:
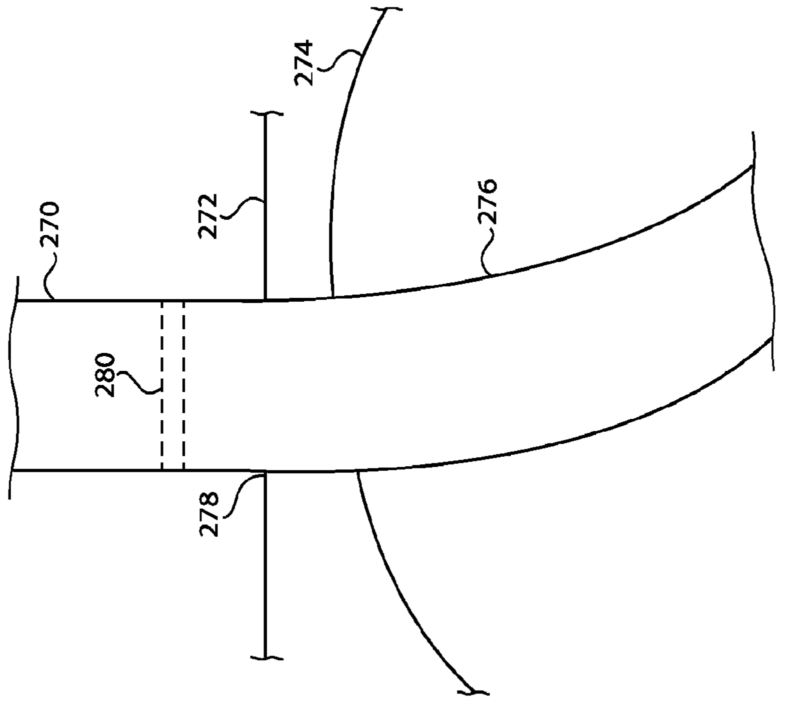
FIG. 11 is an illustrative view showing the replacement of a GJ tube apparatus according to one embodiment.
Figure 10:
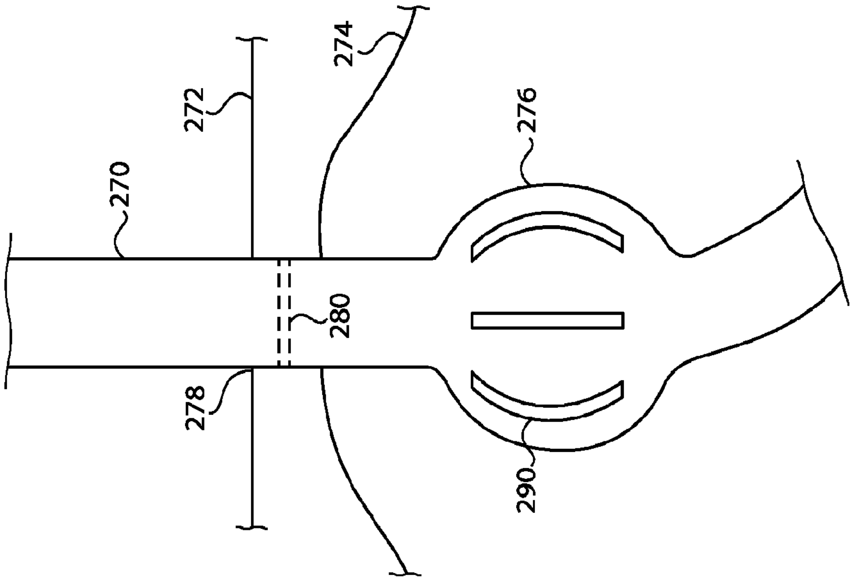
FIG. 10 is an illustrative view showing the replacement of a GJ tube apparatus according to one embodiment.
Figure 12:
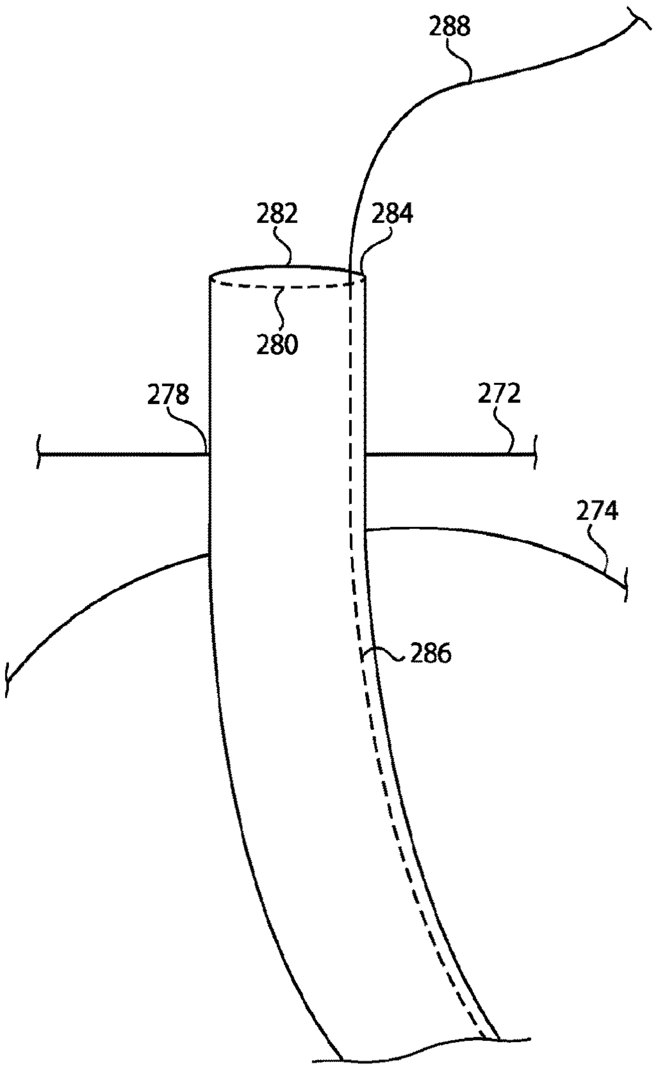
FIG. 12 is an illustrative view showing the replacement of a GJ tube apparatus according to one embodiment.

As discussed above, medical professionals have for many years struggled with blocked GJ tubes only to have to replace them entirely when a blockage cannot be cleared. FIGS. 10-12 illustrate a procedure suitable to remove and replace a GJ tube apparatus according to one embodiment of the disclosed invention. In this particular example, a GJ tube apparatus 270 according to one or more of the embodiments previously described having one or more blocked tubes/feeding lumens is to be replaced. The GJ tube apparatus 270 in this example was initially placed in the patient by creating a stoma 278 through the abdominal wall 272 and stomach 274 such that the cut indicia 280 on the tube were disposed within the patient. In other examples, the cut indicia are exterior to the abdominal wall when the GJ tube apparatus is correctly placed. The balloon portion 276 of the apparatus which was inflated to prevent the tube 270 from being withdrawn inadvertently is deflated, if necessary, and the GJ tube apparatus 270 withdrawn until the cut indicia 280 are visible (FIG. 11).

As depicted in FIG. 10, balloon portion 276 may include radiopaque striping 290. Striping or "stripes" 290 can expand and potentially curve in response to inflation of balloon portion 290, giving a user a visual indication, with the assistance of radiography, as to an inflated versus uninflated state of balloon portion 276. When balloon portion 276 is uninflated stripes 290 might be parallel to one another, for instance. Such a feature can eliminate the need to use contrast to determine balloon state.

The exact distance the GJ tube apparatus is withdrawn from the body of the patient to expose the cut indicia may vary, but can be from 5 cm to 20 cm in some instances. The distance the GJ tube apparatus is withdrawn from the abdominal wall and outside the patient will typically be less than the distance to withdraw the distal end of the GJ tube apparatus past the pyloric valve/pylorus. An overall length of GJ tube apparatuses contemplated herein might be from about 60 cm to about 75 cm, while a length between balloon portion 118 and the terminal distal tip might be about 45 cm.

Once the cut indicia are exposed the GJ tube apparatus may be cut, such as with scissors or a surgical knife or scalpel, along the indicia so as to expose the interior of the apparatus 282 including the opening 284 of the guidance tube 286 forming a rescue lumen (FIG. 12). A guide wire 288 is then inserted through the opening 284 and down the length of guidance tube 286 thereby placing the guide wire 288 through the pyloric valve/pylorus and into the small intestine. The clogged GJ tube apparatus may then be withdrawn from the patient through the stoma 278 over the guide wire 288. A fresh, new GJ tube apparatus is then inserted into the patient by threading over the guide wire and advanced to a treatment location, where a gastrointestinal feed opening and a jejunal feed opening of the new GJ tube are above and below the pylorus, respectively, in the patient's gastrointestinal tract. The guide wire is then withdrawn, and the replacement GJ tube secured using typical procedures.

Figure 18:
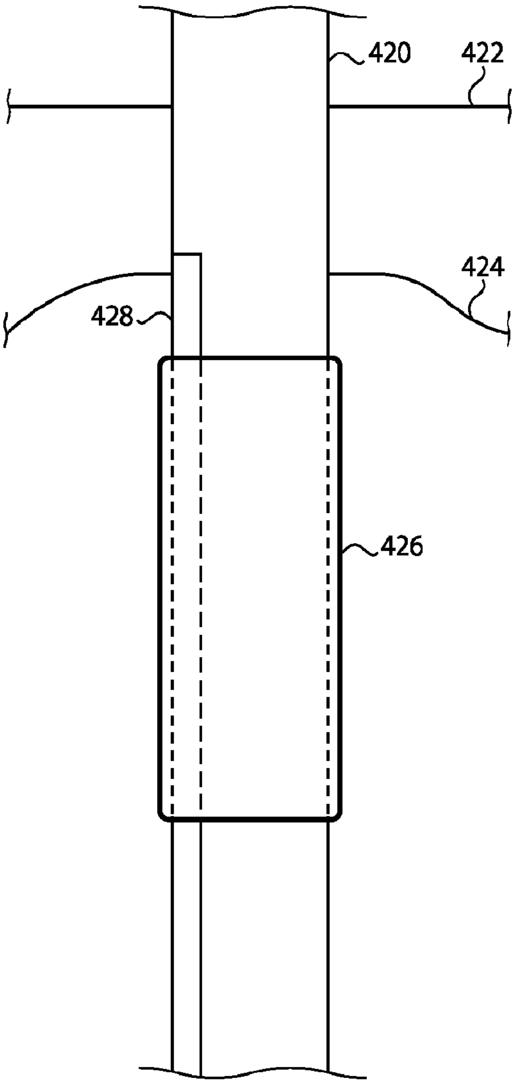
FIG. 18 is an illustrative view showing the replacement of a GJ tube apparatus according to one embodiment.
Figure 19:
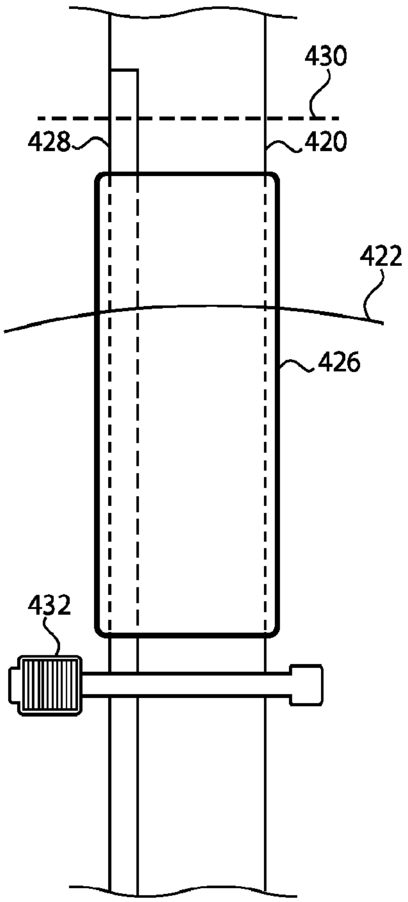
FIG. 19 is an illustrative view showing the replacement of a GJ tube apparatus according to one embodiment.

FIGS. 18-19 illustrate a procedure suitable to remove and replace a GJ tube apparatus according to another embodiment of the disclosed invention. In this particular example, a GJ tube apparatus 420 according to one or more of the embodiments previously described having one or more blocked tubes/feeding lumens is to be replaced. The GJ tube apparatus 420 includes a rescue tube 428 disposed therein and having a sealed proximal end portion. A securing portion 426 such as that previously described with respect to the embodiment depicted in FIG. 14 encircles a portion of the GJ tube apparatus 420 near the sealed proximal end portion of the rescue tube 428. The securing portion 426 may include a mark or indicia to indicate where it should be cut during the replacement procedure or, optionally the device may be configured so that it may be cut anywhere in the securing portion.

In this example, the GJ tube apparatus 420 was initially placed through a stoma formed in the abdominal wall 422 and stomach wall 424. Typically, such placement is made using radiography which may be assisted by fabricating all or portions of the GJ tube apparatus 420 from radiopaque materials. The GJ tube apparatus 420 is initially placed such that the sealed end portion of the rescue tube 428 is disposed within the abdomen and optionally within the stomach. In some examples, the rescue tube may be made of a less flexible material than the GJ tube apparatus body generally. As such, portions of the GJ tube apparatus which include the rescue tube may be stiffer and placing them within the abdomen and/or within the stomach might decrease possible irritation caused by having a stiffer GJ tube disposed outside the body where it would be more difficult to secure than a more flexible GJ tube.

The replacement process begins by releasing any securing features (tape, inflated balloon portions, and the like) and withdrawing the GJ tube apparatus 420 until at least a portion of the securing portion 426 is exposed and accessible (shown in FIG. 19). The exact distance the GJ tube must be withdrawn may vary from application to application, but may be anywhere from about 5 cm to about 20 cm. The distance the GJ tube apparatus 420 is withdrawn from the abdominal wall will typically be less than the distance to withdraw the distal end of the GJ tube apparatus past the pyloric valve/pylorus so as to lessen the risk of accidentally withdrawing the tube too far and requiring radiographic assistance to insure proper placement of the new tube. Once accessible, a securing clip 432 is placed on the GJ tube apparatus 420 distal to the securing portion 426 to prevent the tube from slipping back into the abdominal wall. Once secured, the GJ tube apparatus may be cut, such as with scissors or a surgical knife or scalpel. The cut line 430 may be made at any point along the body of the GJ tube 420, including through the securing portion 426, such that the sealed end portion of the rescue tube 428 is cut off and removed thereby creating an exposed opening 436 to the rescue tube 428 through which a guide wire may be inserted and the GJ tube apparatus replaced. Optionally, the GJ tube apparatus 420 includes a cut line 430 indicia which may include a colored mark, ridges or grooves formed into the tube body, or combinations thereof to indicate a preferred cutting zone or line.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A gastrojejunal (GJ) tube apparatus, comprising:

an apparatus body having an outer wall, a first proximal end, and a second distal end, where the outer wall includes an inflatable balloon portion;

a first tube having an opening in the proximal end of the apparatus body and an opening in the inflatable balloon portion of the outer wall;

a second tube having an opening in the proximal end and an opening between the proximal end and the distal end;

a third tube having an opening in the proximal end and an opening in the distal end; and a guidance tube having a closed proximal end disposed between the proximal end and the distal end of the apparatus body, and an opposite distal end, and wherein cutting the apparatus body creates an opening in the guidance tube.

2. The GJ tube apparatus of claim 1, wherein the outer wall includes at least one cut indicia including a tactile feature and/or a color feature.

3. The GJ tube apparatus of claim 1, wherein the distal end of the guidance tube is located within the small intestine of a patient when the GJ tube apparatus is placed.

4. The GJ tube apparatus of claim 1, further comprising a one-way valve assembly at the distal end of the guidance tube.

5. The GJ tube apparatus of claim 1, wherein a length of the guidance tube is between 50% and 80% of a length of the GJ tube assembly.

6. The GJ tube apparatus of claim 1, wherein the closed proximal end of the guidance tube is disposed between an at least one cut indicia and the proximal end of the GJ tube apparatus.

7. The GJ tube apparatus of claim 1 wherein the apparatus body is formed of a first material and the guidance tube is formed of a second material different from the first material.

8. The GJ tube apparatus of claim 1, wherein the second tube includes a gastric feeding tube, and the gastric feeding tube and the guidance tube are separated by a backfill material.

9. The GJ tube apparatus of claim 1, wherein the GJ tube apparatus body further includes a securing portion between the proximal end and the distal end and having an enlarged diameter.

10. The GJ tube apparatus of claim 8, wherein the securing portion includes at least one of a color feature, a texture feature, and a cut indicia feature.

11. A method of replacing the GJ tube apparatus of claim 8, comprising:

engaging a clip with the GJ tube apparatus distal to the securing portion of the GJ tube apparatus;

cutting the GJ tube apparatus so as to create the opening in the guidance tube;

inserting a guide wire through the opening in the guidance tube until the guide wire exits the distal end of the guidance tube;

withdrawing the GJ tube apparatus while leaving the guide wire in place; and placing a new GJ tube apparatus by threading the new GJ tube apparatus over the guide wire.

12. A gastrojejunal (GJ) tube replacement kit, comprising:

a GJ tube apparatus having:

an apparatus body having an outer wall, a first proximal end, and a second distal end, and an inflatable balloon portion;

a first tube forming an inflation fluid lumen extending between the proximal end of the apparatus body and the inflatable balloon portion;

a second tube forming a gastric feed lumen originating in the proximal end of the apparatus body, and terminating at a gastric feed opening formed between the proximal end and the distal end of the apparatus body;

a third tube forming a jejunal feed lumen originating in the proximal end of the apparatus body and terminating at a jejunal feed opening formed in the distal end of the apparatus body; and a guidance tube forming a retrieval lumen originating at a closed, blind end, and extending to a distal end disposed at a location that is distal to the gastric feed opening; and at least one securing clip.

13. The kit of claim 12, wherein a length of the guidance tube is between 50% and 80% of a length of GJ tube apparatus body.

14. The kit of claim 12, wherein the GJ tube includes an enlarged diameter securing portion.

15. The kit of claim 14, wherein the enlarged diameter securing portion of the GJ tube includes at least one of a color feature, a texture feature, and a cut indicia feature.

16. The kit of claim 12, wherein the GJ tube apparatus further includes a one-way valve assembly positioned at the distal end of the guidance tube.

17. The kit of claim 16 wherein the one-way valve assembly is recessed proximally from a distal tip of the GJ tube apparatus.

18. A gastrojejunal (GJ) medical apparatus, comprising:

an apparatus body having an outer wall, a first proximal end, and a second distal end;

a first tube in the apparatus body forming a lumen with a first opening at the apparatus body proximal end and a second opening at the apparatus body distal end;

a second tube in the apparatus body forming a lumen with an open first end at the apparatus body proximal end and a closed second end disposed between the apparatus body proximal end and the apparatus body distal end;

a third tube in the apparatus body forming a lumen with a closed first end disposed between the apparatus body proximal end and the apparatus body distal end and an opposite second end at the apparatus body distal end; and an anti-cut structure positioned between the apparatus body proximal end and the apparatus body distal end to limit severing the apparatus body;

wherein the closed second end of the second tube is an inflatable balloon portion, and further comprising a fourth tube in the apparatus body forming a lumen with an open first end at the apparatus body proximal end, and a plurality of feed openings disposed between the apparatus body proximal end and the closed first end of the third tube.

* * * * *